US 6,359,749 B1

(12) United States Patent
Fukushima

(10) Patent No.: US 6,359,749 B1
(45) Date of Patent: Mar. 19, 2002

(54) DUAL ELEMENT HEAD WITH RADIAL OFFSET OPTIMIZED FOR MINIMAL WRITE-TO-READ TRACK ERROR

(75) Inventor: Craig N. Fukushima, Monte Sereno, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/419,479

(22) Filed: Oct. 15, 1999

(51) Int. Cl.[7] .............................................. G11B 5/265
(52) U.S. Cl. ...................................................... 360/121
(58) Field of Search ........................... 360/75, 76, 104, 360/105, 113, 121, 122, 124, 77.04, 77.08, 119

(56) References Cited

U.S. PATENT DOCUMENTS 5,682,274 A    10/1997  Brown et al. ............ 360/77.04
5,940,250 A  *  8/1999  McNeil et al. ............... 360/104

* cited by examiner

Primary Examiner—Paul W. Huber
(74) Attorney, Agent, or Firm—David A. Hall

(57) ABSTRACT

A dual element read/write head for a direct access storage device (DASD) positions the read and write elements relative to each other such that the same servo track can be used for read and write operations at the disk outside diameter (OD). As the head is moved across the disk from the OD toward the ID, different servo tracks are used for positioning the read and write elements in the same track as the head moves toward the disk ID. The STW TMR portion of the total TMR at the OD is thereby minimized to zero, so that the total TMR at the OD is primarily a function of only the conventional WW TMR and WR TMR components. The STW TMR gets larger as the head assembly moves toward the ID, so that the total TMR at the ID becomes a function of both the STW TMR and the remaining TMR components. At the ID, however, the read-write element compensation error component of total TMR is smaller than it is at the OD, and can be more easily dealt with, using known servo readback signal processing methods, and making it easier to carry out the typical signal processing employed by servo controllers.

10 Claims, 4 Drawing Sheets

DUAL ELEMENT HEAD WITH RADIAL OFFSET OPTIMIZED FOR MINIMAL WRITE-TO-READ TRACK ERROR

BACKGROUND OF THE INVENTION

1. Field of the Invention

This invention relates generally to direct access storage devices and, more particularly, to read/write head assemblies for use in such storage devices.

2. Description of the Related Art

In a conventional computer direct access storage device (DASD) having a rotating storage medium, such as a magnetic or magneto-optical disk, data is stored in a series of concentric or spiral tracks across the surface of the disk. A magnetic disk, for example, can comprise a disk substrate having a surface on which a magnetic material is deposited. The digital data stored on a disk comprises magnetic information that is represented as a series of variations in magnetic orientation of the disk magnetic material. The variations in magnetic orientation, generally comprising reversals of magnetic flux, represent binary digits of ones and zeroes. A read/write assembly produces and detects variations in magnetic orientation of the magnetic material as the disk rotates relative to the head, thereby reading data from, and writing data to, the disk surface.

The surface area of each disk in a DASD may be partitioned into sectors having a short servo track information area followed by a user data area. Each sector can be defined by an imaginary radial line extending from the disk center to the disk outer diameter, or circumference. The servo track information generates a readback signal that is used to position the transducing head across the disk surface. The user data area of a sector contains data tracks in which data is recorded by an end user, or disk drive customer. The servo track information area of a sector typically includes a sector marker, track identification data, and a servo burst pattern, which are recorded at the time of disk manufacture. The transducing head used for reading the servo track data is typically the same head that is used for reading the customer data, but typically a different magnetic head is used for writing the customer data. Such dual-element heads permit optimal exploitation of transducer characteristics for the read and write functions. Increased track densities permit storing more customer data in a DASD with no increase in physical disk size. Such higher track densities have been achieved with transducer advancements such as magneto-resistive heads.

A magneto-resistive (MR) head assembly is a dual-element head that typically includes an MR element for reading user data and servo pattern information, and a different element (typically an inductive element) for writing customer data to the disk. A dual-element assembly having an MR read element and a write element will be referred to as an MR head. The MR element of an MR head exhibits a change in resistance when in the presence of a changing magnetic field. The change in resistance of the MR element is transformed into a voltage signal by passing a constant bias current through the MR element. The MR head generates a fluctuating voltage readback signal as the MR head is passed over the magnetic information recorded on the disk magnetic material. In a DASD using digital demodulation, the fluctuating readback signal is digitized and the digital data values of the sampled readback signal are processed to recover the recorded data.

A disk drive DASD typically includes two signal paths for the head readback signal, comprising a data channel and a servo channel. When the MR head is over a customer data field, the readback signal is processed by the data channel so the system can read and write customer data to and from the disk. When the MR head is over a servo field of the disk, the readback signal is processed by the servo channel to read the servo pattern information that is pre-recorded on the disk at the time of manufacture.

A read/write head assembly is mounted on a disk arm that is moved across the disk by a servo. A disk drive servo control system controls movement of the disk arm across the surface of the disk to move the read/write head assembly from data track to data track and, once over a selected track, to maintain the assembly in a path centered over the selected track. Maintaining the head assembly centered over a track facilitates accurate reading and recording of customer data. With the very high track density of current disk drives, even the smallest head positioning error can potentially cause a loss of customer data.

In the servo information area of a disk sector, the sector marker indicates to the read/write transducing head that servo information immediately follows in the track. The track identification area contains a binary representation of the servo track (or data track) associated with the servo information. The servo burst pattern contains data that generates an analog voltage signal whose magnitude is such that the position of the transducer head relative to a single track can be determined. That is, as the position of the head changes from one edge of a track to the other edge of the track, the magnitude of the readback signal changes, and this is used to keep the head centered in the track for optimal reading and writing of customer data.

Track Misregistration (TMR) Error

A read/write head in a rotary disk drive actuator will exhibit positioning error called track misregistration (TMR) error, which produces errors in reading and writing data to a disk. The total disk TMR is generally made up of two types of error: (1) write-to-read error (WR TMR), comprising the error in reading data from a track into which the data was previously written, and (2) write-to-write error (WW TMR), comprising the error in writing new data into a data track that is adjacent to previously written data. There are various types of disk drive characteristics that can contribute to the total TMR.

For example, some types of error contribute to both WR TMR and WW TMR. These include disk spindle motor runout, which generates an off-center condition to the disk rotation, airflow induced vibration of the read/write head, head seek settling time, electrical and magnetics system noise, and external disturbances such as shock to the drive. These components of total TMR are generally greater toward the outside diameter of the disk (OD), and are lesser toward the inner diameter of the disk (ID). Disk controllers generally include signal processing that is designed to minimize or compensate for such error. Part of such processing may, for example, compensate for the offset between the disk head write element and the disk head read element. These signal processing systems may, themselves, contribute a read-write element compensation error component to the total TMR error, although generally such compensation systems are only involved in read operations subsequent to write operations, and so such errors will only contribute to WR TMR.

Some disk drive design involves minimizing such components of total TMR. For example, FIG. 1 illustrates a conventional MR head assembly in which the read element and the write element are aligned. The servo control system of a disk with such a read/write head will compensate for WR TMR such as described above. Generally, the head configuration of FIG. 1 will result in no tracking error at the inside diameter (ID) of the disk. As the disk head assembly moves toward the outer diameter (OD) of the disk, the servo control system compensates for the skew, or offset, between the tracking of the read element and the write element at the middle of the disk. FIG. 1 is a view looking down on the read/write MR head assembly 100, where the MR head is indicated as having a write element 102 spaced apart from a read element 104, in position above a data track 106 of the disk 108. It can be seen that the write element and read element are aligned along the longitudinal axis 110 of the head assembly, which is also the longitudinal axis of the data track 106 above which the head is positioned. The head assembly 100 has a separation "d" between the write element and the read element.

In a different head configuration, the read and write elements of a dual element head are manufactured with a radial offset, such that the heads do not follow along the same longitudinal servo track, but will tend to be aligned in the same servo track only at certain points in the disk arm movement across the disk. Such designs are typically used where it is desired to minimize the read-write element compensation error component of WR TMR. For example, a system that employs a head assembly with radially offset read and write elements is described in U.S. Pat. No. 5,682,274 assigned to International Business Machines (IBM) Corporation.

FIG. 2 shows a schematic plan view representation of a prior art disk drive storage system showing a two-element MR head assembly 200 with a write element 202 and a read element 204 positioned above a track 206 of a disk 208. FIG. 2 illustrates that the write element 202 and read element 204 are radially offset from each other, relative to the longitudinal axis 210 of the MR head. As described in the U.S. Pat. No. 5,682,274, the radial offset of the two elements can be selected so as to minimize the distance necessary to move the MR head for any track on the disk drive to read data following a write operation when the head is midway across the disk. The separation "d" between the write element and read element is indicated in FIG. 2, as is the skew angle "c" of the read/write element centers relative to the centerline 210. In this way, the processing needed to compensate for read/write element offset is minimized when the head assembly is midway across the disk, and fluctuates generally an equal amount from the ID to OD limits. This is said to make compensation processing less complicated over the entire range of disk arm motion.

Another component of total TMR error not described above is generally referred to as servo track writer (STW) error. This is the error in disk head positioning that can result from using different servo tracks to read and write data from the data tracks. In older disk configurations, a single set of servo tracks could be used for positioning the read/write head over several different data tracks. More recently, the track pitch between data tracks has been steadily shrinking, so that different servo tracks must be used to position the read/write head assembly between read and write operations.

That is, because of increasing data track densities, disk drive systems may exhibit STW errors, in which the read/write head assembly will necessarily use one servo track for positioning the read element and will use a different servo track for positioning the write element, even to read and write data from the same data block on the disk. In that case, each servo track will have an associated servo pattern pitch and runout, or "ruler" scale, and using the two different tracks for positioning will generate the STW component of total TMR. The STW TMR is added to all other TMR components and contributes to both WR TMR and WW TMR. The STW TMR can increase read/write track misregistration during readback processing of previously written data. Because of manufacturing requirements, most dual element heads cannot be constructed eliminate STW TMR error, and such error can potentially greatly increase, due to increasing track densities.

From the discussion above, it should be apparent that there is a need for a disk drive storage system that more effectively compensates for the STW TMR component of total TMR and increases the accuracy of disk arm positioning with disks of increasing track densities. The present invention solves this need.

SUMMARY OF THE INVENTION

The present invention provides a dual element read/write head for a direct access storage device (DASD) wherein the read and write elements are positioned relative to each other such that the same servo track can be used for read and write operations at the disk outside diameter (OD), rather than at the disk inner diameter (ID) or midpoint. As the head is moved across the disk from the OD toward the disk ID, the misalignment between the head elements relative to a data track gets progressively worse, so that different servo tracks are used for positioning the read and write elements as the head moves toward the disk ID. As a result of this head configuration, the contribution of the STW TMR to the total TMR at the OD is minimized to zero for the readback process, so that the total TMR at the OD is primarily a function of only the conventional WW TMR and WR TMR components, including the read-write element compensation error component of WR TMR. Because the misalignment between the read and write elements gets larger as the head assembly moves toward the ID, the total TMR at the ID becomes a function of both the STW TMR and the remaining TMR components. At the ID, however, the read-write element compensation error component of total TMR is smaller than it is at the OD, and can be more easily dealt with, using known servo readback signal processing methods. Therefore, optimizing the read and write element radial offset to minimize that offset at the OD results in a read/write head for which it is easier to carry out the typical signal processing employed by servo controllers. That is, conventional signal processing techniques can be used for positioning the head assembly.

In one aspect of the invention, the radial offset distance x between the write element and the read element is given by an angle $\alpha$ that is determined by the disk radius distance $R_x$ from the disk center to a tangent point along the OD data track, the distance P from the disk center to the disk arm pivot point, and the distance L from the disk arm pivot point to the tangent point. Thus, the size of the disk and the positioning of the disk arm actuator uniquely determine the radial offset between the write element and read element) and permit control of disk arm movement with conventional servo processing controllers.

Other features and advantages of the present invention should be apparent from the following description of the preferred embodiment, which illustrates, by way of example, the principles of the invention.

DESCRIPTION OF THE PREFERRED EMBODIMENT

Figure 1:
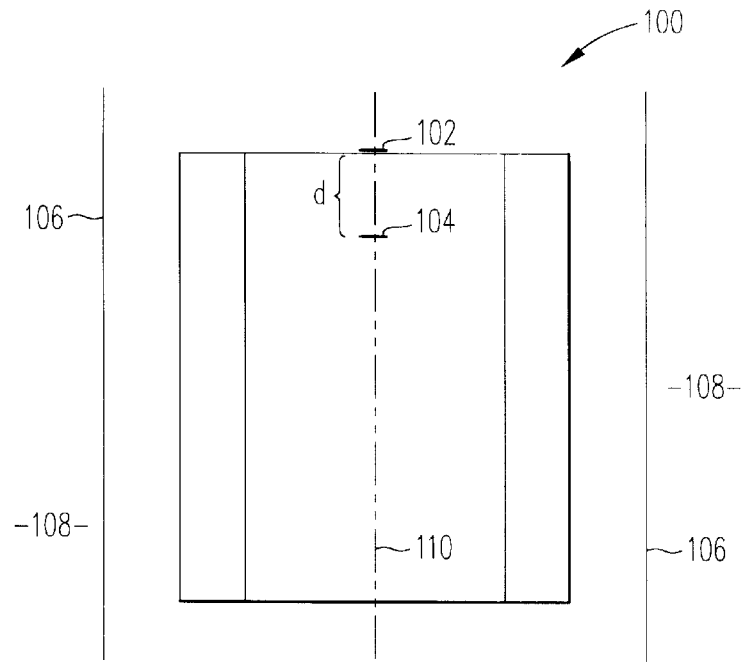
FIG. 1 is a schematic plan view representation of a prior art disk drive storage system showing a dual-element head assembly with longitudinally aligned read and write elements.
Figure 2:
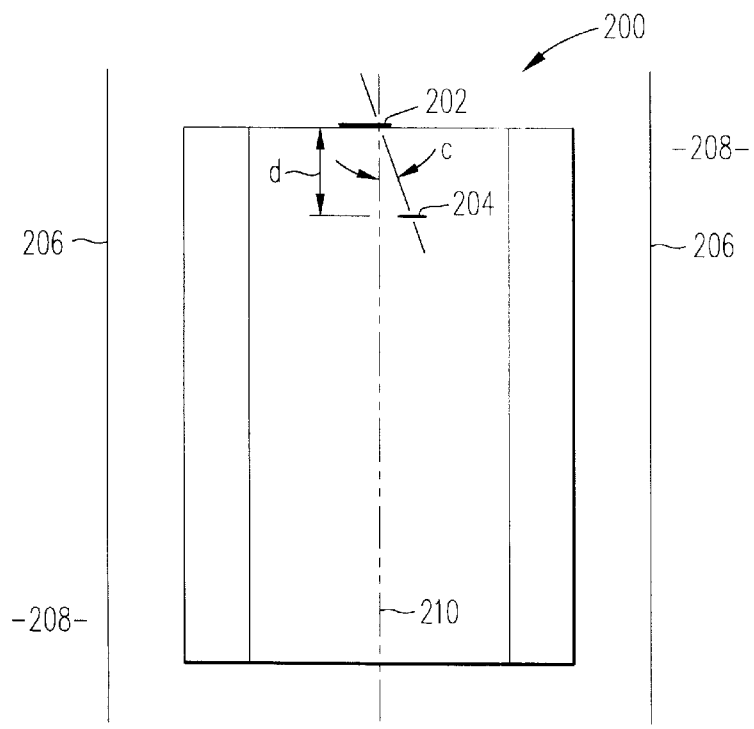
FIG. 2 is a schematic plan view representation of a prior art disk drive storage system showing a dual-element head assembly with read and write elements that are radially offset so as to minimize the distance necessary to move the actuator when the head assembly is midway across the disk.
Figure 3:
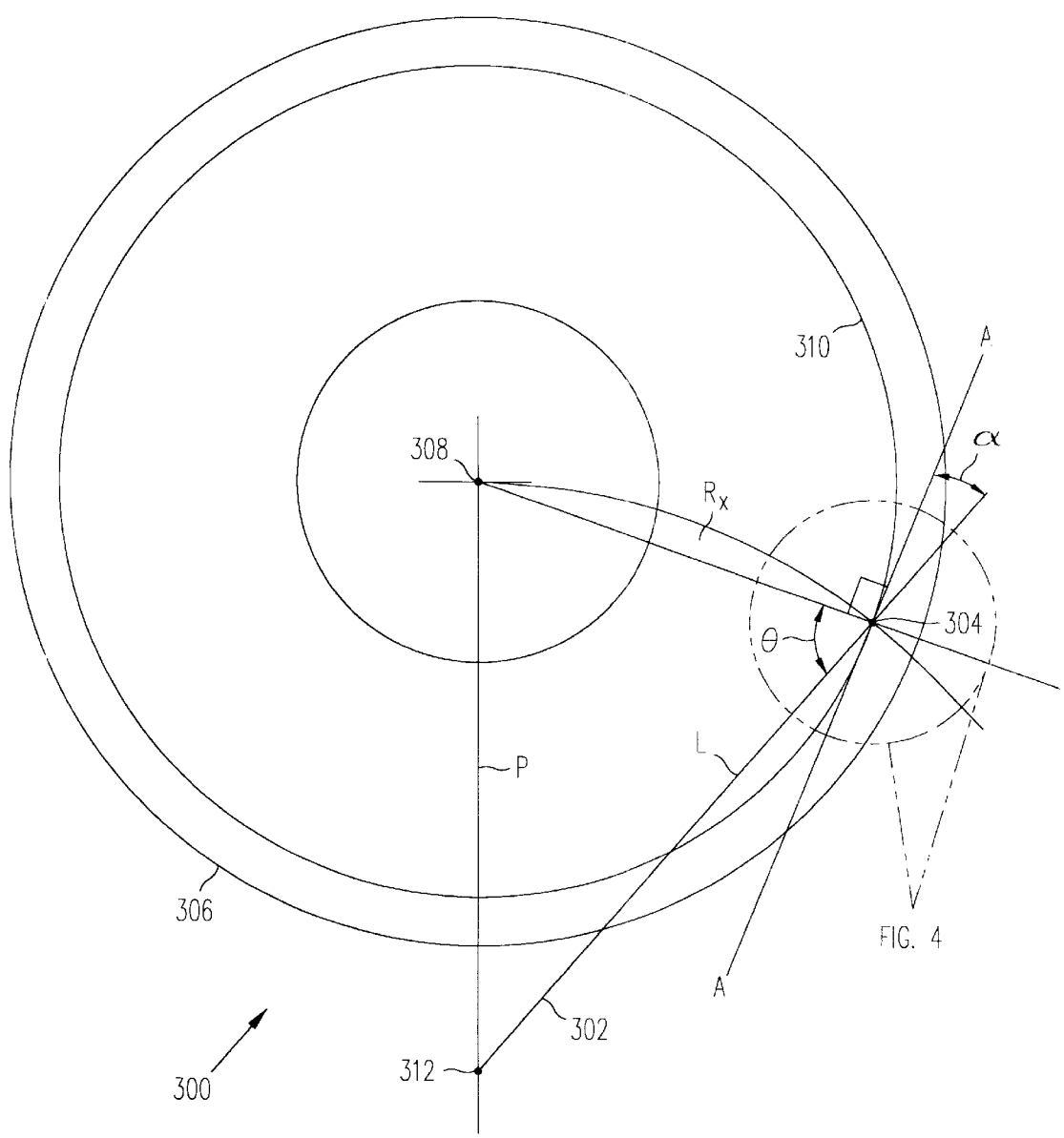
FIG. 3 is a schematic plan view of a disk drive storage system with a disk arm and head assembly constructed in accordance with the present invention.

FIG. 3 shows a disk drive storage system 300 represented in schematic form, with a disk actuator arm 302 that moves a dual-element MR head assembly 304 across the surface of a recording media disk 306. The head assembly 304 is represented in FIG. 3 by a single point for simplicity of illustration and for showing the geometry involved, but those skilled in the art will understand that the head assembly comprises a separate write element and read element, which are shown in greater detail in FIG. 4. The geometry illustrated in FIG. 3 shows the disk radius distance $R_x$ from the disk center 308 to a tangent point that coincides with the position of the head assembly 304 in FIG. 3, at the OD data track 310. A tangent line A is drawn in FIG. 3 through the tangent point 304. Also shown in FIG. 3 is the distance P from the disk center 308 to the disk arm actuator pivot point 312, and the distance L from the disk arm pivot point 312 to the tangent point 304. These parameters $R_x$, P, and L are determined by the size of the disk 306, the track pitch, and the positioning of the disk arm actuator 312.

In accordance with the invention, the radial offset x between the write element and read element of the head assembly is uniquely determined by the parameters $R_x$, P, and L, and the separation g between the read and write elements, such that the same servo track is used for read and write operations at the disk outside diameter (OD), and different servo tracks are used for the read and write elements as the disk head moves toward the disk inside diameter (ID). As a result of this head configuration, the contribution of the STW TMR component at the disk OD is equal to zero, and the total TMR at the OD is primarily a function of the conventional TMR components, including read-write element compensation error. Because the STW TMR gets larger as the head assembly moves from the OD toward the ID, the total TMR at the ID is a function of both the conventional TMR components (including the read-write element compensation error) and also the STW TMR. At the ID, however, the read-write element error TMR is smaller than it is at the OD, and many of the other conventional TMR components are also smaller. As a result, the TMR computations can be more easily dealt with at the disk ID, using servo readback signal processing methods known to those skilled in the art. This is due to the fact that the magnitude of the TMR error components are more equally spread out between the OD and ID of the disk, so that STW TMR is zero at the disk OD and other conventional TMR error components (including read-write element compensation error) are greater at the disk OD, whereas STW TMR is greater at the disk ID, but the other conventional TMR error components are smaller at the ID. Thus, conventional signal processing techniques can be used for positioning the head assembly having the configuration specified by the present invention. In this way, the present invention provides a disk drive storage system that more effectively compensates for total TMR including STW TMR, and increases the accuracy of disk arm positioning with disks of increasing track densities.

Figure 4:
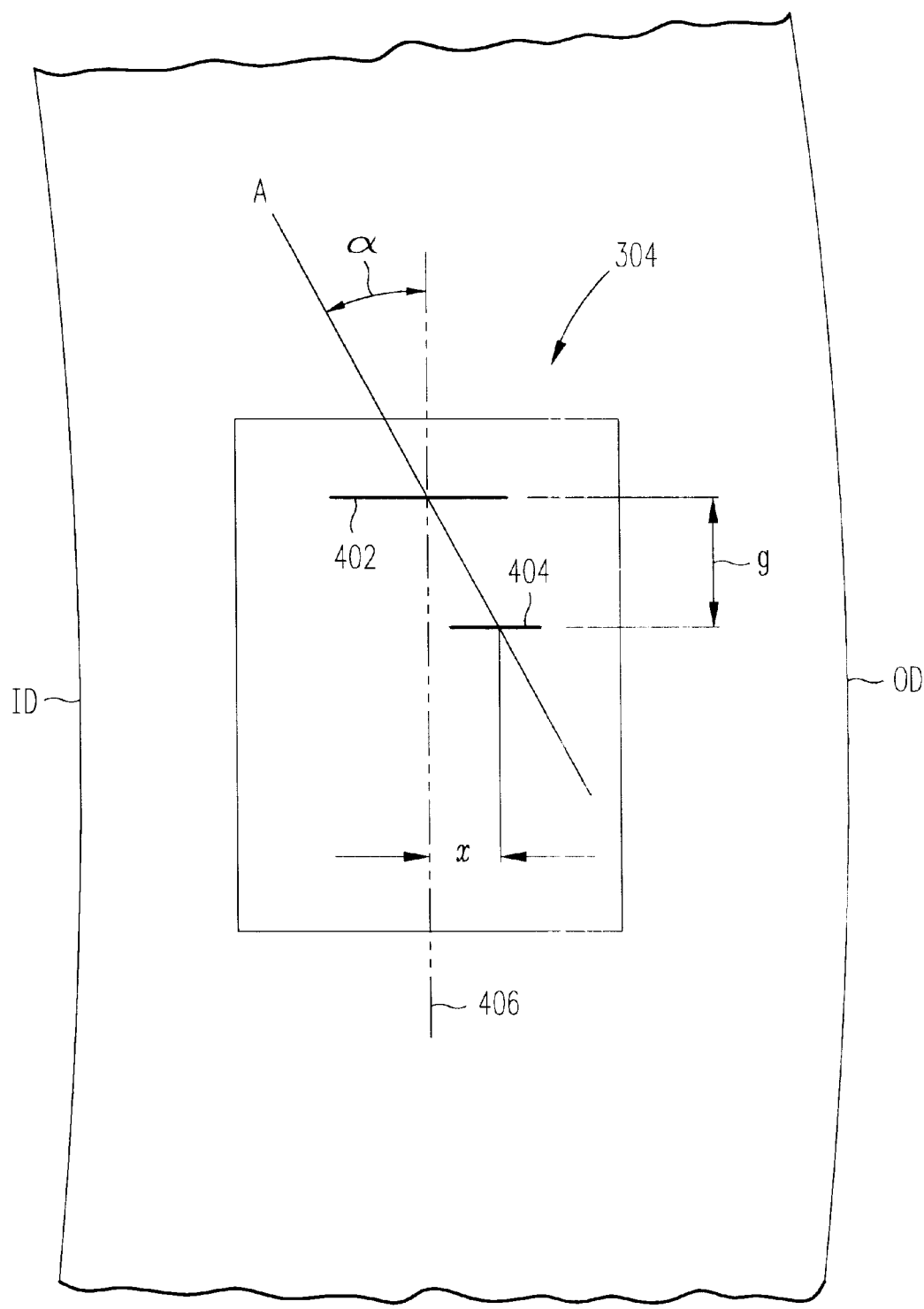
FIG. 4 is a schematic plan view representation of the dual element head assembly illustrated in FIG. 3.

FIG. 4 shows the dual element MR head assembly 304 illustrated in FIG. 3 with the write element 402 radially offset from the read element 404 by a lateral distance x. The head assembly 304 is shown as it would appear suspended over a data track of the disk, with the disk ID and OD indicated on the drawing, along with the longitudinal centerline 406 of the head assembly. The radial offset x is shown in FIG. 4 as the lateral distance between the center of the write element 402 and the center of the read element 404. The longitudinal separation g between the write element and read element is generally specified within the limits of head manufacturing tolerance. The skew angle α is determined from the disk configuration (disk size and track spacing) such that the write element and the read element will use the same servo track at the disk OD data track 310. Thus, the lateral separation x is determined by the disk size and g, the longitudinal separation between the read and write elements. FIG. 4 also reproduces the tangent line A, with the angle α indicated.

The radial offset x represents the optimal read/write element lateral distance for reading and writing data from the same servo track at the disk OD. As noted above, conventional signal processing will help position the disk arm as it moves from the OD track toward the ID. In accordance with the invention, the radial offset x is easily determined, as follows For disk configurations having the geometry illustrated in FIG. 3, where P>L, and where $R_x$ is the radius at the disk OD data track 310 as described above, then the skew angle α is given by Equation (1) below:

$$\alpha = 90° - \theta, \qquad \text{Equation (1)}$$

where θ is shown in FIG. 3, and then θ can be derived with Equation (2) below for the conditions listed above:

$$\cos\theta = (R_x^2 + L^2 - P^2)/2R_xL, \qquad \text{Equation (2)}$$

which gives the equation for skew angle a by Equation (3) below:

$$\alpha = 90° - \cos^{-1}[(R_x^2 + L^2 - P^2)/2R_xL]. \qquad \text{Equation (3)}$$

Solving for the radial offset x then gives Equation (4):

$$x = g\tan(\alpha). \qquad \text{Equation (4)}$$

Thus, the radial offset x between the read and write elements becomes a function of the read/write element separation g and the skew angle α, where the separation g is a characteristic of head design and manufacturing tolerances. The radial offset x is generally specified on the order of microns.

In designing a disk head assembly in accordance with the invention, it is necessary to determine the longitudinal separation between the read and write elements and obtain the disk size parameters for the intended disk application. When these parameters are determined, the head configuration in terms of radial offset between the write element and read element are easily specified in accordance with the invention, as described above. The separation g is generally a function of head design and manufacturing tolerances. Consequently, the invention optimizes the radial offset x given the separation with which the head designer must work. A particular advantage of the present invention is that conventional servo control signal processing techniques may be used. Another advantage is that the magnitude of required compensation for tracking error is more equal across the surface of the disk, making processing techniques easier. Those skilled in the art will understand how to implement the required servo control techniques for such a head assembly configuration without further explanation.

Figure 5:
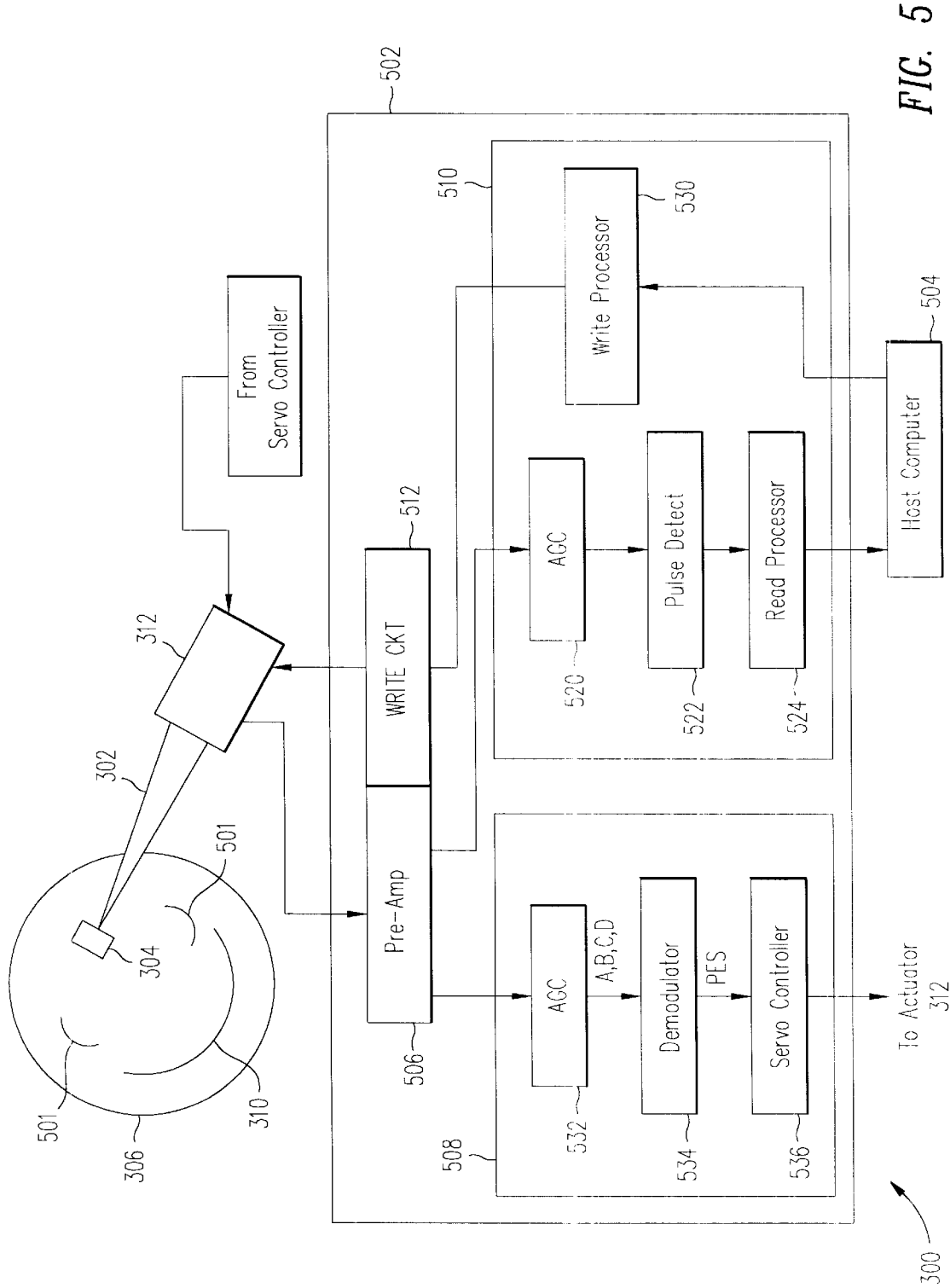
FIG. 5 is a block diagram representation of the disk drive storage system illustrated in FIG. 3.

FIG. 5 illustrates the direct access storage device (DASD) 300, first shown in FIG. 3, with greater detail to illustrate the DASD components. In FIG. 5, reference numerals duplicated from FIG. 3 should be understood to refer to the same elements. The DASD 300 includes multiple disks 306, although the top surface 307 of only one disk is shown. The surface of each disk is coated with a magnetic recording medium for storing magnetically encoded information The read/write head assembly 304 is mounted on the disk actuator arm 302 and is moved across the surface of the disk 306. As the disk rotates, a readback signal is generated from the head assembly 304, which is constructed with magneto-resistive (MR) read elements. Those skilled in the art will appreciate that the head assembly repeatedly passes above the surface of multiple servo fields and data fields of the disk, generating either a servo readback signal or data readback signal. Alternatively, a write signal can be provided to the head assembly for recording data in the disk surface.

The disk arm 302 is moved under control of a disk servo controller 502 to move from the OD data track 310 and across the disk surface toward the ID, or disk center. The OD data track 310 is shown in FIG. 5, as are additional disk servo and data tracks 501. The controller 502 serves as the interface between the disk drive 300 and a host computer 504. The host computer may comprise, for example, a desktop computer, a laptop computer, a mainframe computer, or any other digital processing device for which storage of data on a disk is desired.

In the preferred embodiment of FIG. 5, the disk drive controller 502 includes a readback signal pre-amplifier circuit 506 ("pre-amp"), which receives electrical representations of the data recorded on the disk surface as sensed by the MR read/write head assembly 304. The readback pre-amp 506 serves a dual purpose by amplifying either data signals or servo signals, depending on whether the associated read/write head 304 is positioned over stored customer data or over servo pattern data, respectively. Thus, the amplified signal from the pre-amp 506 is directed to two processing channels: a servo channel 508 and a customer data channel 510. A write circuit 512 is provided to supply the read/write head 304 with customer data signals from the data channel 510 for recording onto the disks 306.

The data channel 510 generally writes and reads data to and from a disk 306 in response to requests from the host computer 504 to read or write the customer data. The write circuit 512 is connected only to the customer data channel 510. In the data channel, the pre-amp 506 amplifies the readback signal from the MR head and directs the readback signal to an automatic gain control and filter circuit (AGC) 520. The output from the AGC is provided to a data pulse detector 522 that forms digital pulses corresponding to the analog readback signals. Next, a pre-host read processor 524 converts the data pulses into formatted data strings that are compatible with the host computer 504. For write operations, data is received from the host computer and is provided to a write processor 530, which formats the data and delivers it to the write circuit 512 for recording onto the disk surface.

The servo channel 508 generally reads servo data from the disk 306 to aid in properly positioning the read/rite head 304. When operating in conjunction with the servo channel 508, the pre-amp 506 amplifies servo signals produced when the read/write head transduces servo patterns. The servo channel 508 includes an automatic gain control (AGC) and filter circuit 532, which may comprise any one of various known circuits for automatically adjusting the readback signal gain and filtering it The output of the AGC and filter circuit comprises processed analog A, B, C, D servo data The AGC function of the circuit 532 is typically performed by a variable gain amplifier and gain control circuitry. Such gain control is intended to automatically adjust for relatively slow amplitude variations in the readback signal. These variations are usually caused by changes in the MR head-to-disk spacing, drift in the MR head bias current, drift in the gain from the pre-amp 506, and the like.

Next, a demodulator/decoder 534 receives the processed readback signal, derives digitized A, B, C, D burst values, and produces P and Q quadrature data. The demodulator also generates a position error sensing (PES) signal that indicates the position of the MR head 304 relative to a track center of the disk 306. Those skilled in the art will understand how to derive the P and Q data and how to generate the PES signal, from the digitized readback signal samples, without further explanation. The PES signal is then provided to a servo controller 536, which uses the PES data to generate a control signal that is provided to the actuator motor 312 and thereby controls the position of the MR head 304.

The present invention has been described above in terms of presently preferred embodiments so that an understanding of the present invention can be conveyed. There are, however, many configurations for disk drive control systems and head assemblies not specifically described herein but with which the present invention is applicable. The present invention should therefore not be seen as limited to the particular embodiments described herein, but rather, it should be understood that the present invention has wide applicability with respect to disk drive control systems and head assemblies generally. All modifications, variations, or equivalent arrangements and implementations that are within the scope of the attached claims should therefore be considered within the scope of the invention.

I claim:

1. A read/write head for use in a direct access storage device (DASD), the read/write head comprising:
    a write element that receives a write signal and causes data to be recorded onto the surface of a recording disk in a write process; and
    a read element that transduces data recorded on the surface of the recording disk from servo tracks and data tracks, and generates a readback signal in a readback process;
    wherein the read and write elements are radially offset to each other such that they are aligned in the same servo track at the outside diameter (OD) data track and the same servo track is used for read and write operations at the OD, whereby the contribution of servo-writer TMR at the OD is minimize to zero for the readback process and total TMR at the OD is primarily a function of conventional read-write element error (WR) TMR and write-write error (WW) TMR, and wherein different servo tracks are used for the read and write elements at the disk inside diameter (ID), such that the total TMR at the ID is a function of both the WW TMR and WR TMR components, and the servo-writer TMR.

2. A head as defined in claim 1, wherein the radial offset x is the lateral distance between the center of the write element and center of the read element, and is specified by the relation x=g tan(α), wherein g is the separation between the read element and the write element, α is the skew angle between the write element and read element such that it is a function of $R_x$, P, and L, for P>L, and wherein $R_x$ is equal to disk radius distance from the disk center to a tangent point of the head at the OD data track, P is the distance from the disk center to a pivot point of the disk arm, and L is the distance from the disk arm pivot point to the tangent point.

3. A head as defined in claim 2, wherein the skew angle α in degrees is defined by the equation:

$$\alpha=90°-\cos^{-1}[(R_x^2+L^2P^2)/2-R_xL].$$

4. A head as defined in claim 1, wherein the head comprises a magneto-resistive (MR) head.

5. A data storage device comprising:

a magnetic recording medium; and a dual element head having a write element and a read element, wherein the write element receives a write signal and causes data to be recorded onto the surface of a recording disk in a write process and the read element transduces data recorded on the surface of the recording disk from servo tracks and data tracks, and generates a readback signal in a readback process;

wherein the read and write elements are radially offset to each other such that they are aligned in the same servo track at the outside diameter (OD) data track and the same servo track is used for read and write operations at the OD, whereby the contribution of servo-writer TMR at the OD is minimized to zero for the readback process and total TMR at the OD is primarily a function of conventional read-write element error (WR) TMR and write-write error (WW) TMR, and wherein different servo tracks are used for the read and write elements at the disk inside diameter (ID), such that the total TMR at the ID is a function of both the WW TMR and WR TMR components, and the servo-writer TMR.

6. A data storage device as defined in claim 5, wherein the radial offset x is the lateral distance between the center of the write element and the center of the read element, and is specified by the relation x=g tan(α), wherein g is the separation between the read element and the write element, α is the skew angle between the write element and read element such that it is a function of $R_x$, P, and L, for P>L, and wherein $R_x$ is equal to disk radius distance from the disk center to a tangent point of the head at the OD data track, P is the distance from the disk center to a pivot point of the disk arm, and L is the distance from the disk arm pivot point to the tangent point.

7. A data storage device as defined in claim 6, wherein the skew angle α in degrees is defined by the equation:

$$\alpha=90°-\cos^{-1}[(R_x^2+L^2\ P^2)/2-R_xL].$$

8. A data storage device as defined in claim 5, wherein the head is a magneto-resistive (MR) head.

9. A method for determining the skew angle α between a write element and a read element in a dual-element head assembly for a disk data storage device having an arm that moves the head across the disk, the method comprising:

determining $R_x$, the disk radius distance from the disk center to a tangent point of the head assembly at a disk outside diameter (OD) data track;

determining P, the distance from the disk center to a pivot point of the disk arm;

determining L, the distance from the disk arm pivot point to the tangent point; and calculating the skew angle α specified by the equation $$\alpha=90°-\cos^{-1}[(R_x^2+L^2-P^2)/2R_xL].$$

such that the read and write elements are radially offset to each other such that they are aligned in the same servo track at the outside diameter (OD) data track and the same servo track is used for read and write operations at the OD, whereby the contribution of servo-writer TMR at the OD is minimized to zero for the readback process and total TMR at the OD is primarily a function of conventional read-write element error (WR) TMR and write-write error (WW) TMR, and wherein different servo tracks are used for the read and write elements at the disk inside diameter (ID), such that the total TMR at the ID is a function of both the WW TMR and WR TMR components, and the servo-writer TMR.

10. A method as defined in claim 9, wherein the radial offset x is the lateral distance between the center of the write element and the center of the read element, and is specified by the relation x=g tan(α), wherein g is the separation between the read element.

* * * * *